3,385,836
PREPARATION OF DIALLYL PHTHALATE PREPOLYMERS
Sol A. Mednick, Baltimore, Md., Leonard Seglin, New York, N.Y., and William B. Tuemmler, Catonsville, Md., assignors to FMC Corporation, New York, N.Y., a corporation of Delaware
Continuation-in-part of application Ser. No. 396,508, Sept. 15, 1964. This application Sept. 8, 1965, Ser. No. 485,882
8 Claims. (Cl. 260—78.4)

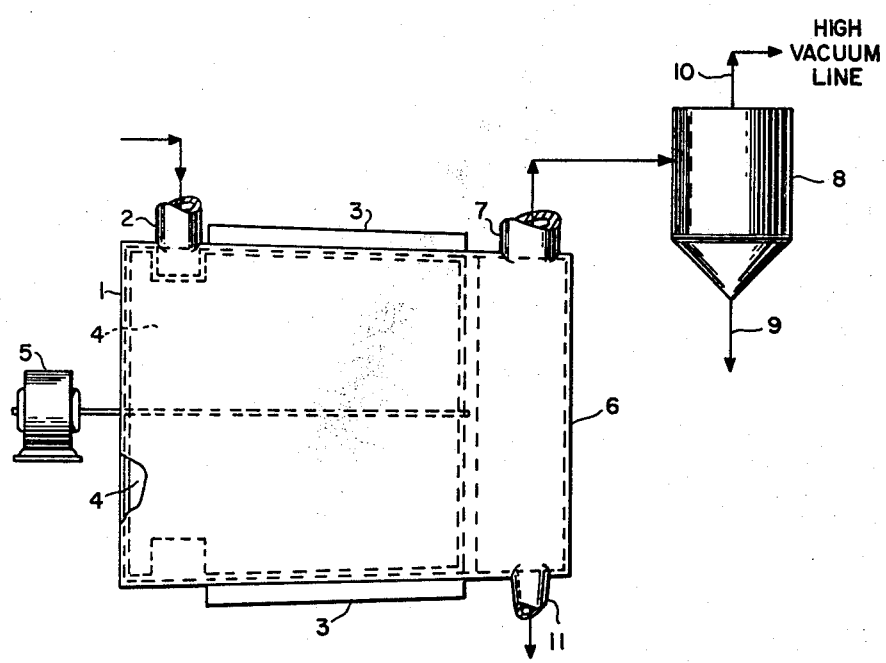

ABSTRACT OF THE DISCLOSURE

This application discloses a method of producing diallyl phthalate prepolymer by polymerizing diallyl phthalate monomer under conditions which leave no significant amount of catalyst residue in the resulting mixture of prepolymer and monomer and then distilling the prepolymer-monomer mixture continuously under high vacuum in a still of short residence time, in which the prepolymer-monomer mixture is spread as a thin film to insure rapid heat transfer and high evaporative surface, at an elevated temperature such that the molten prepolymer will flow from the still.

---

This application is a continuation-in-part of application Ser. No. 396,508, filed Sept. 15, 1964, now abandoned.

This invention relates to soluble prepolymers derived from alkenyl esters of polybasic acids—for example, the various diallyl phthalates—and aims to provide a process for producing such prepolymers in optimum condition for further polymerization, but at a much lower cost than heretofore known processes.

The first synthetic polymers—the phenol-formaldehyde resins—and their immediate descendants such as the alkyd, urea-formaldehyde and melamine-formaldehyde polymers are all thermosetting resins. The components of these resins can be reacted in stages, to first form solid soluble, fusible, storage polymers of moderate molecular weight which are, at the intermediate stage of cure, compounded with fillers, pigments, solvents and the like, to produce compositions which can be formed into films, laminated structures and molded articles and which can then be converted into the insoluble and infusible state by further treatment, generally by using heat with or without catalyst. These polymers are known as condensation polymers because they polymerize in large part by elimination of water between molecules.

With the progress of polymer chemistry, it was early recognized that, in general, cross-linking thermosetting resins can be made from any organic compounds which contain a plurality of double bonds which are unconjugated with respect to carbon, for example, divinyl-benzene, the allyl acrylates, and especially the polyalkenyl esters of polybasic acids such as the diallyl phthalates. However, unlike the condensation polymers, the preparation of useful, soluble, fusible intermediates is not a simple matter.

In the case, for example, of the polyalkenyl esters of polybasic acids such as the diallyl and dimethallyl phthalates, polymerization is easily induced by peroxide catalysis and heat; but useful products are not easily obtained. In general, such a polymerization, whether in mass, in suspension or in emulsion form, gels to an insoluble, three-dimensional network while the major portion of the monomer is still unreacted; and the gelled mixture, containing a major portion of monomer, is no longer readily useful in the preparation of films, laminates or molding compositions. If polymerization is stopped even just short of gelation, so much monomer remains that further conversion is slow and is accompanied by excessive shrinkage. In case of diallyl phthalates, conversions in excess of about 35% cannot normally be obtained before gelation. As a result, such polymers were not commercially useful until the discovery of a method of separating monomer from the polymer in the ungelled polymerization mixture just prior to gelation, as taught in U.S. Patents 2,273,891, 2,370,578 and 2,377,095. As described in these patents, monomer is polymerized, at low conversions, to form a soluble, fusible polymer having residual unsaturation. The prepolymer is precipitated with methanol or some other solvent which retains the monomer in solution, and is then isolated for compounding, forming, and final cure to an insoluble resin. This, of necessity, produces a high cost resin, since it means the conversion of only a minor proportion of the monomer, and the recovery and recycling of unreacted monomer, together with very large quantities of solvent.

Despite their high cost, these soluble allylic polymers, generally known as prepolymers, have found a place in industry. They are particularly valuable for the production of molded parts which show excellent electrical properties, particularly under conditions of high humidity. They mold especially well and cure with minimum shrinkage, so that they are useful in the preparation of parts which require accurate molding; and they are useful in the production of laminates since they can produce superior laminates under relatively low pressure conditions, so that they are useful in the treatment of many sorts of bases (for example, wood veneer) which would be crushed if they were laminated under high pressure.

In the twenty-odd years which have elapsed since these prepolymers were first commercialized, a great deal of effort has gone into the problem of reducing their cost while retaining their excellent properties. Only one method, other than precipitation from methanol, has proven commercially acceptable for the separation of unconverted monomer from prepolymer—that is the liquid-liquid extraction with aqueous acetone described in U.S. Patent 2,613,201. This process offers very little advantage over the methanol process, except for slightly less plant handling.

Considerable work has been done on the obvious expedient of vacuum distilling unreacted monomer from the so-called "dope" obtained by the bulk or other polymerization of the monomer, which produces a low concentration (20–35%) solution of prepolymer in unreacted monomer. However, this expedient has not been used commercially because it just has not worked to produce satisfactory prepolymer.

It has been possible to remove monomer from some dopes by vacuum distillation and obtain prepolymers without gelling, as described in U.S. Patent 2,446,314. However, we have found that such prepolymers are successfully processed only because the dopes from which they are produced contain impurities which function as polymerization inhibitors resulting in final products which require 3 to 4 times as long for conversion as the commercial but expensive prepolymers obtained by the conventional solvent processes. For example, a diallyl phthalate monomer which is bulk-polymerized for 2½ hours at 250° C. without gelation, as disclosed in U.S. Patent 2,446,314, produces a dope containing polymerization inhibitors. The product resulting from the process cures so slowly that it is unsatisfactory in molding applications. Diallyl phthalate free of these inhibitors will produce a gel at 250° C. in under two hours.

When inhibitor-free dopes are vacuum distilled in conventional fashion even at very low pressures, gelation always ensues before the monomer present is reduced to a sufficiently low level to produce a commercially acceptable prepolymer.

We have now discovered how to produce a reactive prepolymer from a diallyl phthalate dope by vacuum distillation, which product is directly comparable and competitive with prepolymer obtained by the expensive commercial solvent processes. We have found it necessary, in order to get such a product, to (1) Polymerize the diallyl phthalate under conditions which leave no significant amount of catalyst residue in the polymerization dope. This is done either (a) by using a diallyl phthalate which will polymerize in the absence of catalyst at 200° C. under nitrogen at a rate indicated by an increase of refractive index $N_D$ of at least about 0.000012 per minute, and either thermally polymerizing without catalyst, or using catalyst in such small quantity that it is substantially destroyed before the end of the polymerization, or (b) by catalyzing by the continuous introduction of a catalyst with a low half-life at the polymerization temperature during the early part of the polymerization and finishing the polymerization thermally; and (2) Distill the dope continuously under high vacuum in a still of short residence time, in which the dope is spread as a thin film in order to insure rapid heat transfer and high evaporative surface, at an elevated temperature such that the viscous residue will flow from the still.

A typical satisfactory still is shown in the accompanying drawing. It comprises a tapered drum 1 to which dope can be fed through a duct 2. The still is heated by a jacket 3. As the material enters, it is spread over the inner wall of the cylinder by an inner drum 4, rotating by motor 5, the drum carrying adjustable wiper blades which govern the thickness of the film on the inner surface of the tapered drum 1; these blades keep the dope moving in a thin film on the inner surface of the heated, tapered drum 1, where the product is exposed to heat and high vacuum for a short residence period. The vapors pass through a separation chamber 6, into an exit 7 to a cyclone separator 8; the overhead is recovered through a line 10 and recirculated to the polymerizer; the bottoms 9 are returned to the still. The liquid separating in the chamber 6 is carried through an exit 11 and is the desired product.

Other forms of continuous vacuum stills can be used, provided they insure short residence time; this requires distillation from a thin film, and continuous feed and removal of product.

As indicated above, the monomer used in preparing the dope must, in the form of the invention set forth in 1(a) above be capable of rapid polymerization. The polymerization may be conducted by simply heating, or the time cycle may be reduced by the use of polymerization catalysis. If peroxides are used for this purpose, care should be taken to add the peroxides sufficiently early to insure their substantially complete elimination before polymerization is complete. While peroxide catalysts are present, the polymerization rate is extremely rapid. After exhaustion of the catalyst, the polymerization proceeds at a constant rate, depending on temperature and monomer quality, unless more peroxide is added. The rate of polymerization is most readily measured by the increase in refractive index ($N_D^{25}$). A rate of at least about .000012 per minute at 200° C. under nitrogen is needed if the prepolymer prepared by the process of this form of the invention is to be satisfactory in molding compounds.

When diallyl phthalate monomers with lower inherent thermal rates of polymerization are used in the practice of this invention, they cannot be polymerized by ordinary polymerization techniques, either by thermal polymerization or by ordinary polymerization in the presence of catalysts. Apparently, when polymerized by ordinary techniques (as in Heiberger Patent 3,096,310) they produce dopes which contain polymerization inhibitors, which are removed by the solvent which is used in the prior art solvent extraction process. They cannot be used in the practice of this invention, unless they are specifically polymerized as described in the U.S. application of S. A. Mednick, one of the inventors herein, filed simultaneously with this invention in the U.S., and entitled Polymerization of Allylic Esters.

In accordance with that invention, satisfactory dopes for conversion by short residence high vacuum thin film distillation can be made by polymerizing at temperatures of not in excess of about 225° C. and preferably 200° C. or less, by continuously subjecting the polymerization mixture to free radical initiators during the early part of the polymerization, and finishing the polymerization thermally for a period of time without additional exposure to fresh free radical initiator to reduce any residual free radical initiators in the dope to a content of the order of a few parts per million or less. The free radical initiator may be ultraviolet light, or it may be air diluted with nitrogen (which presumably forms peroxides in-situ) but most conveniently is a catalyst such as an organic peroxide or azo-bis-isobutyronitrile, with a half-life, of the order of a few minutes or less (preferably under about 2 minutes) at the polymerization temperature. With such catalysts, thermal polymerization for a period of about ten times the half-life of the catalyst is sufficient to reduce the content of free radical initiator down to a few parts per million or less.

The catalyst may be added at a uniform rate throughout its addition, or it may be added at somewhat varying rates. Addition of very small quantities toward the latter part of the cycle is useful when the inherent thermal polymerization rate of the monomer is very low; when catalyst is added at the rate of a fractional part per million per minute, the residual catalyst is very rapidly eliminated at the end of the polymerization, and very little time is needed to dissipate residues.

The process not only produces a product which is satisfactory for use in this invention, but also insures much more rapid polymerization without the development of color. Regardless of whether or not straight thermal polymerization or short life catalyst polymerization is used, the degree of polymerization obtained is a function of time and reaction temperature. Higher average molecular weights are obtained at any specified final reaction viscosity as the reaction temperature is decreased. The average molecular weight may be estimated by determining the viscosity of a 25% solution of prepolymer in monomer at 25° C. The preferred viscosity of such a 25% solution is in the range of 250–400 centipoises, preferably near 300–350 centipoises. To achieve this solution viscosity a reaction temperature of about 200° C. to a final reaction viscosity of about 500 centipoises at 25° C. is satisfactory.

It is essential that at the end of the polymerization, the residual peroxide in the dope be substantially eliminated, down to the range of a few parts per million or less. Presence of substantial amounts of residual peroxide will cause gelation in the still.

In distilling the product, the temperature, film thickness and residence time are adjusted so that the material will flow even after substantially all monomer is removed; this requires the product to reach a temperature of at least 150° C., and preferably 170° to 200° C. Moreover, if the product is to be used in molding, it should contain only small quantities of monomer; this is accomplished by running the still so that at least 90%, and preferably more than 95% of the monomer is evaporated.

The distillation is preferably conducted by running the dope directly into the still, and removing the monomer in a single pass. The residence time necessary obviously will vary with the amount of monomer in the dope, with film thickness, with temperature and with pressure. Obviously, if part of the monomer is prestripped, the residence time may be shortened; and necessary residence times are shortened by higher vacuums and temperatures, and lower film thicknesses. We prefer to operate, for convenience, in a single pass, at temperatures of the order of 180° to 200° C., with original film thicknesses of the order of a few millimeters and with vacuums of the order of 1 mm. or less of mercury. These conditions give average residence times of 1 to 5 minutes.

Typical examples of the process are given by way of example only, and not by way of limitation.

EXAMPLE 1

Charge:
Diallyl ortho-phthalate—10.5 l. (11.6 kilos), $N_D^{25}$—1.5181; obtained by reaction of sodium ortho-phthalate and allyl chloride.
Tertiary-butyl hydroperoxide—15 ml. of a solution of 920 mg. of tertiary-butyl hydroperoxide in 90 ml. of diallyl phthalate—153 mg., 13 p.p.m.

Procedure: The diallyl phthalate was charged to a three-necked, 12 liter flask equipped with a sample line, an agitator, a thermometer dipping into the reaction mixture and provisions for a nitrogen atmosphere. The diallyl phthalate was heated rapidly to 200° C. and then maintained at this temperature until a satisfactory viscosity was obtained whereupon the polymerization was terminated by rapid cooling. The reaction mixture was sampled as the polymerization progressed and the following data were obtained:

| Time (min.) | $N_D^{25}$ | Dope Viscosity, 25° C. (cs.) | Comments |
| --- | --- | --- | --- |
| 0 | 1.5185 | | |
| 20 | 1.5209 | | |
| 40 | 1.5224 | | |
| 120 | 1.5235 | | |
| 190 | 1.5248 | | |
| 250 | 1.5255 | | |
| 280 | 1.5260 | | The batch took 75 minutes to reach 200° C. at which temperature the tertiary butylhydroperoxide was added. |
| 310 | 1.5265 | | |
| 370 | 1.5275 | 50 | |
| 430 | 1.5282 | 65 | |
| 490 | 1.5290 | 75 | |
| 550 | 1.5300 | 100 | |
| 610 | 1.5310 | 145 | |
| 650 | 1.5316 | 180 | |
| 690 | 1.5324 | 255 | |
| 720 | 1.5329 | 285 | |
| 750 | 1.5332 | 340 | |
| 770 | 1.5335 | 400 | |
| 780 | 1.5339 | 450 | Cool. |

Note that the refractive index, $N_D^{25}$, after initiation, rises .0024 in the first 20 minutes, during the initial phase of the reaction; in the balance of the polymerization, it rises .0130 in 760 minutes, an average increase of .000017 per minute.

Several runs of dope prepared in the manner described were fed to the wiped film still shown in the drawing at 80 microns pressure, a jacket oil temperature of 195° to 205° C., at 13.5 pounds per hour for an average residence time of two minutes. The streams from the still were in the ratio of 72 parts of distilled diallyl phthalate to 28 parts of viscous residual polymer which issued from the heating section of the still at 190° C. The residual polymer cooled to a brittle glass which was readily crushed, and ground with a mortar and pestle.

The following laboratory data were obtained:

| | |
| --- | --- |
| Methanol extractibles _____percent__ | 0.5–.8 |
| Prepolymer solution viscosity _____C.P__ | 359 |
| Solution in acetone | Clear |
| Iodine number | 60 |
| Brabender gel time _____min__ | 16.7 |

Brabender gel time is a measure of speed of cure. A mixture of 45 grams of prepolymer, 15 grams of monomer and 0.6 gram of t-butyl perbenzoate are charged to a Brabender Plastograph and fluxed at 250° F.; the time to gelation is recorded. Gelation times above 30 minutes indicate the prepolymer will not cure rapidly enough for commercial molding cycles. The Brabender Plastograph, Model PLV1, which is here used is described in an article by W. T. Blake in Plastics Technology, vol. 4, 1958, p. 909.

The product was evaluated in an asbestos filled molding compound against standard product obtained by precipitation of dope with methanol. The compounds were made as follows:

Asbestos filled molding compound

| Composition: | Parts by wt. |
| --- | --- |
| Prepolymer | 190 |
| Diallyl phthalate monomer | 10 |
| t-butyl perbenzoate | 6 |
| Calcium stearate | 4 |
| Asbestos floats | 200 |

Processing: The ingredients were combined in a Hobart mixer for 20 minutes. The mixture was sheeted on two 6" x 12" differential speed heated rolls with the faster moving roll heated to 200° F., the slower moving roll heated to 180° F. Total compounding time was 2 minutes, with no premature gelation or curing on the rolls. The sheet was stripped, cooled and granulated using a Wiley Mill. ASTM test pieces were molded at 300° F. for 5 minutes using 6 tons (10" ram) or 4,800 p.s.i.

There were no difficulties in preparing the molding compound, indeed the flow was excellent. Cured bars after the standard molding procedure had the following properties:

| | | Standard |
| --- | --- | --- |
| Heat distortion temperature—168° C. (10 mils) | | 159±6.5 |
| Rockwell hardness—103M | | 101–104 |
| Flexural strength—7910 p.s.i. | | 7500–8000 |
| Flexural modulus—1.065×10⁶ p.s.i. | | .98–1.10×10⁶ |

All these values are equivalent or better than those obtained with standard material prepared by methanol extraction.

EXAMPLE 2

Dope prepared as in Example 1, but with a refractive index increase of 0.000015 per minute was distilled continuously at 1 mm. with an oil temperature of 190° C. and a residence time of 2.5 minutes. The residual prepolymer was comparable in properties to that obtained in Example 1 but contained three percent methanol extractibles.

For comparison, another sample of the same dope, 1063 grams, was batch distilled at a pressure of 0.5–0.7 mm. of mercury starting at a pot temperature of 145° C. The temperature rose over a 25 minute period to 180° C. at which time the residue contained 30 percent monomer. Distillation was very difficult because of the great viscosity. On cooling the residue became quite hard, but was completely soluble in acetone.

Also for comparison, a third sample was batch distilled and the distillation continued with difficulty to 195° C. pot temperature over 20 minutes when gelation occurred although the residue still contained 15 percent monomer.

EXAMPLE 3

A monomer was prepared from phthalic anhydride and allyl alcohol, using a sulfuric acid catalyst. On straight thermal polymerization, at 200° C., the $N_D^{25}$ average rise was .000019 per minute. The product obtained by distillation as in Example 1 was of excellent quality.

EXAMPLE 4

Example 1 was repeated, using the monomer of Example 3, initiating polymerization with 7.5 p.p.m. t-butyl hydroperoxide, and running the polymerization at 200° C. The average rise in $N_D^{25}$ was .000018 per minute during polymerization. The residual prepolymer product obtained from the distillation was comparable with the product of Example 1.

EXAMPLE 5

The monomer of Example 1 was heated to 250° C. After 65 minutes, $N_D^{25}$ was 1.5354, and viscosity at 25° C. was 460 centistokes. Half the batch was removed, and stripped as in Example 1, to produce a prepolymer which had excellent molding properties, but a substantially lower molecular weight than the product of Example 1.

Polymerization of the second half of the batch was continued at 250° C.; gelation occurred after a total heating time of 110 minutes.

EXAMPLE A FOR COMPARISON

A sample of commercially available diallyl phthalate was polymerized initially at 200° C. The rate of rise in refractive index was only 0.000006 units per minute, despite three additions of 20 p.p.m. of t-butyl hydroperoxide. The polymerization was finally conducted at 230° C. where a rate of 0.000026 units per minute was obtained, to the same viscosity as in Example 1. The prepolymer, after separation in the wiped film still, had a Brabender gel time of 60 minutes, as against 16.7 minutes for the product of Example 1, and 16 to 20 minutes for standard, precipitated material. It cured much too slowly for commercial molding operations.

EXAMPLE B FOR COMPARISON

When the monomer used in Example A was polymerized in the normal commercial fashion in the presence of t-butyl perbenzoate and 50 percent hydrogen peroxide at 120° C. for 10 hours, the prepolymer isolated by extraction and precipitation of half the dope with methanol still contained about 0.05 percent of residual active oxygen. The remaining half of the dope gelled on attempted continuous distillation at 160° C., in the wiped film still.

EXAMPLE 6

A sample of the commercially available diallyl phthalate which was used in Examples A and B was polymerized in accordance with the method disclosed in the Mednick application referred to above. The procedure used was as follows: 140 lbs. of monomer was heated to 200° C. and when this temperature was reached, a solution of di-tert.-butyl peroxide, 20 g. in two liters of monomer, was fed into the reaction mixture at the rate of 6 ml./min., for about 80 minutes until 500 ml. had been added (to make a total of 79 p.p.m. catalyst). During this portion of the reaction the increase in refractive index was at the rate of 1.6 refractive index units per minute (1 RIU=.0001). Thereafter heating was continued for another 110 minutes at 200° C. until the reaction viscosity reached 500 centipoises, at which time the product was cooled rapidly. The dope was continuously distilled in the wiped film still at 204° C. and 0.8 mm. of mercury to produce a polymer containing 1.5% methanol extractibles. After cooling, crushing and grinding the polymer was tested against a standard diallyl phthalate polymer and was found to be comparable.

Di-tert.-butyl peroxide has a half-life of about 0.4 minutes at 200° C.

EXAMPLE 7

One-hundred-forty pounds of diallyl isophthalate was used. This is a material which by the polymerization technique of Example A yields an unsatisfactory product insofar as gel time is concerned, and a gelling product if made in accordance with Example B. It was charged into a still and heated to 200° C. A solution of 20 g. of di-tert.-butyl peroxide in two liters of the monomer was fed into the material at a rate of 6.6 ml./min. A log was made of the reaction:

| Time (min.) | $N_D^{25}$ | Reaction Viscosity, 25° C. (cs.) | Comments |
|---|---|---|---|
| 0 | 1.5211 | | |
| 10 | 1.5212 | | |
| 20 | 1.5212 | | |
| 40 | 1.5220 | | |
| 60 | 1.5225 | | |
| 80 | 1.5234 | | |
| 110 | 1.5246 | | |
| 150 | 1.5264 | | |
| 170 | 1.5273 | | |
| 200 | 1.5290 | | |
| 230 | 1.5307 | 130 | |
| 250 | 1.5315 | 190 | |
| 270 | 1.5328 | 340 | |
| 282 | | | Stop peroxide feed, 1,850 ml. added, 290 p.p.m., 1.0 p.p.m. per minute. |
| 290 | 1.5337 | 500 | |
| 310 | 1.5337 | 530 | |
| 330 | 1.5340 | 535 | |
| 348 | | | Start addition of peroxides. |
| 358 | | | Stop addition of peroxide, 75 ml. added, 12 p.p.m., 1.2 p.p.m./min. |
| 368 | 1.5343 | 832 | |
| 378 | 1.5343 | 832 | |
| 393 | | | Add peroxides for 2 min. |
| 405 | 1.5343 | 902 | |
| 425 | 1.5343 | 970 | |
| 445 | 1.5343 | 1,000 | Cool. |

The final product was successfully distilled in a continuous, thin-film still at 203° C., 1.2 mm. of mercury, and contained 4.1% methanol soluble material.

The product was directly comparable with the standard commercial material made by the process of Example B but solvent extracted.

Other successful polymerizations were run like Examples 6 and 7 using tertiary butyl perbenzoate at 175° C. added at the rate of 1 p.p.m. per minute (catalyst half-life 0.4 minute at 175° C.); 2,5-dimethyl-2,5-di(t-butyl peroxy)hexane at 170° C., added at the rate of 1.25 p.p.m. per minute (catalyst half-life 1.6 minutes at 170° C.); 2,5-dimethyl-2,5-di(t-butylperoxy)hexane at 200° C., added at the rate of 1.25 p.p.m. per minute (catalyst half-life under 0.1 minute) at 200° C.; 2,5-dimethylhexane-2,5-diperoxybenzoate added at the rate of 1.0 p.p.m. per minute, at both 150° C. (catalyst half-life 1.1 minutes) and 165° C. (catalyst half-life 0.2 minute). It is also possible to produce a satisfactory product by initiating the reaction with a very small amount, 50 p.p.m., of tertiary-butyl hydroperoxide 90, which has a half-life of 23 minutes, followed by sweeping through the material with air diluted with nitrogen so as to have 4% oxygen, stopping the sweeping and thereafter finishing the polymerization thermally at 200° C. for a sufficient time to destroy residual peroxide to produce a satisfactory polymer in about 5 hours. Other satisfactory catalysts with short half-lives include azo-bis-isobutyronitrile, dibenzoyl peroxide; as the temperature of the reaction is increased, more stable peroxides can obviously be used, since the half-life of all catalysts is strongly temperature dependent.

Obviously these examples can be multiplied indefinitely without departing from the scope of the invention as defined in the claims.

What is claimed is:

1. The method of separating a soluble prepolymer of a diallyl phthalate from a mixture comprising prepolymer and monomer from which it is derived, and substantially free of residual polymerization catalyst, which comprises continuously feeding the mixture into a zone of high vacuum in the form of a thin film while heating to a temperature sufficient to permit rapid flow of molten prepolymer after being freed from monomer, withdrawing the monomer overhead and the molten prepolymer as bottoms.

2. The method of producing a diallyl phthalate prepolymer of rapid cure time which comprises polymerizing a monomer which has a polymerization rate under nitrogen at 200° C., after exhaustion of polymerization catalyst, of at least an increase of .000012 in $N_D^{25}$ per minute, to produce a polymerization dope with a peroxide content not in excess of a few parts per million, and continuously feeding said dope into a zone of high vacuum in the form of a thin film while heating to a temperature sufficient to permit rapid flow of molten prepolymer after being freed from monomer, withdrawing the monomer overhead and the molten prepolymer as bottoms in a period of a few minutes.

3. The process of claim 2, in which the polymerization is conducted without adding catalyst.

4. The process of claim 2, in which the polymerization is conducted at a temperature of about 190° to 210° C. whereby a product of optimum molecular weight is obtained.

5. The process of claim 2 in which the distillation temperature is about 150° to 200° C.

6. The process of claim 2, in which at least 90% of the monomer present in the dope is removed overhead.

7. The method of claim 1 for producing a diallyl phthalate prepolymer in which the diallyl phthalate monomer is polymerized by heating at a temperature under 225° C. while continuously subjecting the polymerization mixture to a free radical initiator whose effect is sharply reduced within a few minutes after the polymerization mixture is no longer subject to fresh application thereof, and completing the polymerization by heat alone to the desired endpoint for a period sufficient to reduce residual polymerization promoter in the polymerization mixture to a content not in excess of a few parts per million.

8. The method of claim 7 for producing a diallyl phthalate prepolymer in which the free radical initiator is a catalyst with a half-life of the order of under a few minutes at the polymerization temperature and in which the catalyst is continuously added during the early stages of the polymerization and the polymerization is completed by heat alone for a period at least ten times the half-life of the catalyst.

References Cited

UNITED STATES PATENTS

| | | | |
|---|---|---|---|
| 2,446,314 | 8/1948 | Wagers et al. | 260—78.4 |
| 3,261,391 | 7/1966 | Gudheim | 159—6 |

JOSEPH L. SCHOFER, *Primary Examiner.*

C. A. HENDERSON, *Assistant Examiner.*